United States Patent [19]

Shefrin

[11] 4,333,551
[45] Jun. 8, 1982

[54] LOAD LIMITER
[75] Inventor: Joseph Shefrin, Springfield, Pa.
[73] Assignee: The Boeing Company, Seattle, Wash.
[21] Appl. No.: 79,934
[22] Filed: Sep. 28, 1979
[51] Int. Cl.³ ............................................... F16F 7/12
[52] U.S. Cl. .................................... 188/372; 188/65.4
[58] Field of Search .................... 188/1 C, 65.4, 65.5, 188/371, 372, 374

[56] References Cited
U.S. PATENT DOCUMENTS
2,578,753 12/1951 Smith ............................... 188/1 C X
3,126,072 3/1964 Johansson ........................... 188/1 C
3,372,773 3/1968 Russo et al. ......................... 188/1 C Primary Examiner—Duane A. Reger
Attorney, Agent, or Firm—Robert S. Lipton; Jack D. Puffer

[57] ABSTRACT

A load limiter or a crash attenuation device based on wire bending principals is disclosed. Excessive tensile shocks, such as the accelerative forces imposed on a low stretch load restraint in a helicopter if it crashes, are absorbed by forcing a bifurcated double coil to successively bend and straighten as it travels through a pair of wire guides in response to the forces being transmitted into the limiter by the load restraint. The reaction force absorbed is a function of the wire diameter and stiffness while the reaction stroke is a function of the number of turns in the coil reels. The device further has an adjustment mechanism so it can easily be adapted to a wide variety of design conditions without changing the basic configuration of the limiter.

10 Claims, 13 Drawing Figures

LOAD LIMITER

BACKGROUND OF THE INVENTION

1. Field of the Invention

The present invention relates generally to an energy absorber and more particularly to a wire bending load limiter device having utility wherever shock load restraint under various dynamic conditions may be required.

2. Description of the Prior Art

One problem which constantly recurs in the design and application of load carrying systems, such as cargo carring helicopters, is that of protecting and restraining the load when it is subject to dynamic shock loads such as those resulting from a hard landing or crash. If this is not done, the load can break loose adding significantly to the damage level incurred and presenting extra hazzards to flight personnel and passengers. To prevent this, a cargo restraing operating as a tension device is required to convert the crash pulse into a controlled and limited displacement of the cargo and maintain the restraint load level below the tie-down rupture point. In this field, significant requirements include the ability to accommodate combined loads and the constraints of geometry and human tolerances to 'g' loading. For example, in seat installations the system kinematics, energy absorber type, and location greatly determine the effectiveness of the device used. In cargo application, additional significant general requirements which must be met are that it not impede use, servive all manner of use and abuse, and be compatible with all applicable environmental factors.

For any use, the energy absorption device should be used passively. That is, it should become so much a part of the restraint that there is no temptation not to not use it when cargo is tied down. Specific characteristics that would promote its use are small size and weight, and a shape that would aid rather than discourage use. In addition, rugged packaging is essential. Both the cargo tie-downs and the load limiter crash attenuator must survive severe usage encountered in handling, dropping, scraping, crushing imposed by wheeled vehicles, lack of stowage, use as a tow rope, and many other such non-anticipated functions. Coping with environmental factors include requirements that mud, sand, and corrosive ingredients must be excluded or be reduced to a non-effective role. Lastly, the load limiter must be able to accomodate wide varities of cargo configuration, tie-down direction, and crash pulse shapes with the capability of absorbing both overload and secondary impact conditions. The device should also be low in cost and essentially maintenance free. For such use, it is desirable that such an attentuator produce a constant rate of deformation at a constant force level. The force level should be constant within a close tolerance, from unit to unit, and remain constant as it is used.

Many energy attentuating principles have been demonstrated in the last ten years. These units have been employed in several ways, including simple tension (suspending the load), simple compression (supporting the load as a column), and combined tension and compression (providing rebound capability). In use they involve working of metal so as to limit loads by friction, torsion, shearing, crimping, compressing, expanding, or bending. In particular, devices employing wire bending have shown considerable promise, and units, such as those described by Reilly in U.S. Pat. No. 3,968,863; Jackson in U.S. Pat. No. 3,087,584; and Russo in U.S. Pat. No. 3,372,773, which are all based on this principle, have met with some degree of success. However, these units are usually made to withstand a particular load or units of gravity times a weight value on a static strength design basis. But, in dynamic shock situations typified by a relatively short, high amplitude tensile pulse, the instantaneous maximum load may easily exceed the nominal load carrying capabilities of the restraint system even though the total energy being absorbed is well within system design capabilities. When this happens, the cargo can break loose with resulting increased hazard to passengers and to the flight and, possibly, rescue crews.

A second problem has been that many of these methods have usually been expensive and/or difficult to apply in practice. In use, they have tended not to be too dependable and are particularly susceptible to weather and aging. In addition, the designs were such that they could not easily be adjusted to handle a range of design criteria. The subject invention is designed to correct these problems.

SUMMARY OF THE INVENTION

The energy management concept employed in any load limiting system is based on the conversion of kinetic energy ($\frac{1}{2}$ mV$^2$) to work (F×D). The high 'g' accelerative forces imposed on the cargo by a crash impact are absorbed both by limiting the reaction forces (F) and controlling the cargo stopping distance (D). This is done, in most cases, by introducing load limiting structural hardware into the restraint system which is capable of undergoing permanent deformation at a predictable 'g' constant load over a selected displacement distance. In crash conditions the initial cargo displacement is first taken up by the use of low elongation (low stretch) tension members which provide quick restraint force build-up and avoid amplification of the acceleration (dynamic overshoot). The energy so taken up is then fed into the associated load limiter, so the effect of the use of this energy management concept is both to reduce the level of accelerative forces that need to be reacted, and the number of restraints needed to meet crashworthiness criteria.

The general energy absorption principle used in this invention is wire bending. The particular method by which this is done is forcing a pair of relatively stiff wires to travel around a set of rotating guides in response to the shock pulse. The wires themselves are in the form of a low cost bifurcated double coil, joined in the center by a set of three loops. The centermost loop of the set is elongated so as to be directly attachable to the load restraint, typically, a fabric strap or cargo hook. The ends of this loop are attached to the other two loops which, in turn, after intertwining around the wire guides are attached to the two reels of the double coil. The coil itself is encased in a housing having attachment means adapted to be connected to the load support surface in such a way that, in use, the tensile load forces pass directly through the housing from the strap restraint.

In the event of detrimental deceleration load or a crash and subsequent development of a high 'g' tensile shock pulse, the low stretch restraint starts to pull out on the central coil loop. As this loop moves out, it, in turn, starts pulling the wire in the other two loops and the coils through the guides. In so doing, the stiff wire is forced to bend and straighten several times, which accomplishes the conversion of the kinetic shock energy to work. The travel distance (D), or stroke, is controlled by the number of turns, i.e., the length of the wire, in the reels. As the wire moves out, the reels unwind and the wire in them passes through the guides and out of the housing. The basic design is such that the wire length or stroke is easily adjustable so that the restrained load will not break loose.

In this invention, the utility is further enhanced by the use of a system allowing the adjustment of the device to meet a wide variety of criteria within the same basic framework. Thus, depending on the need and application, it is possible, with relatively little effort and with relatively low, if any, cost, to change the minimum reaction force (F), the stopping distance (D), or both with the same overall structure. It is these mutual capabilities which set the subject invention apart from prior art devices working on the same basic principle.

One further advantage of the unit is that it can be disassembled so that the reactive elements can be replaced after use. Thus, refurbishment of the basic structure is both simple and relatively low in cost.

Accordingly, it is an object of this invention to provide a novel device which will withstand tensile shock loads of a predetermined level and in excess of that amount yield at a substantially constant rate to absorb the energy of that shock load.

It is another object of this invention to provide a load limiting structure which is capable of being incorporated into the design of any equipment used to passively restrain loads under shock loading conditions.

It is a further object of this invention to provide a low cost load limiting structure which is adjustable to meet particular design requirements.

It is still a further object of this invention to provide a load limiting structure in which the stroke is adjustable so that the restrained load does not break free.

It is still another object of this invention to provide a load limiting structure capable of being readily refurbished after use.

Further and other objectives and advantages will be set forth in the description which follows, taken together with the accompanying drawings in which like numbers refer to like parts.

DESCRIPTION OF THE PREFERRED EMBODIMENT

Figure 1:
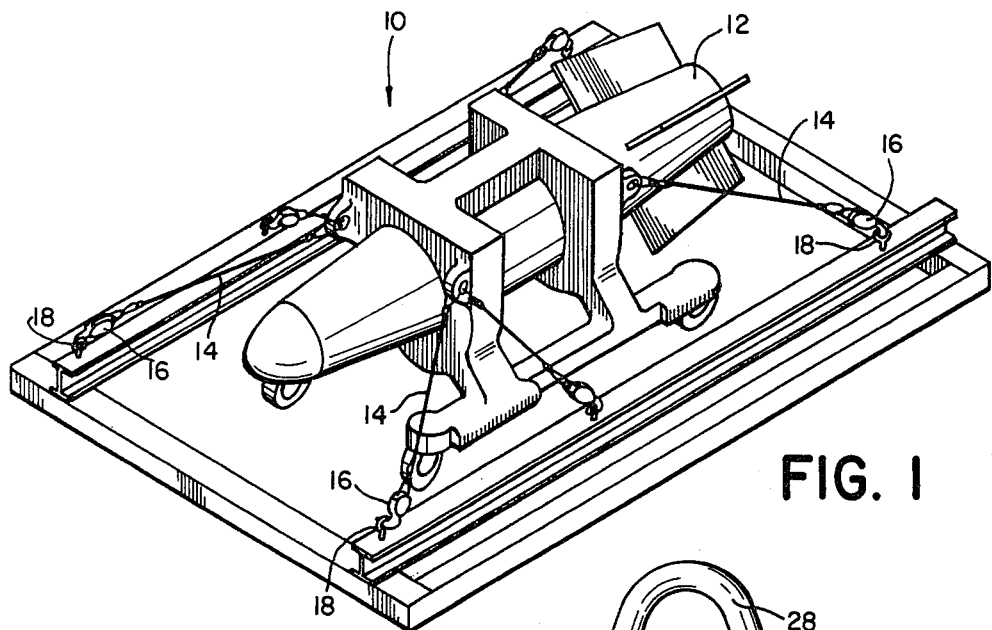
FIG. 1 is a view of the typical load restraint system as used in a cargo carying aircraft.
Figure 2:
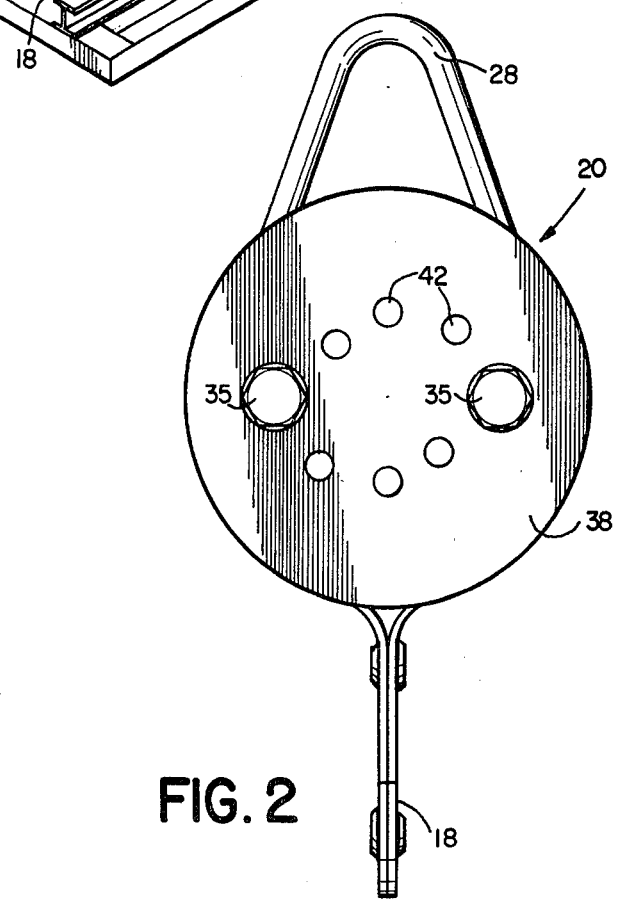
FIG. 2 is a front view of a load limiter in accordance with this invention.
Figure 3:
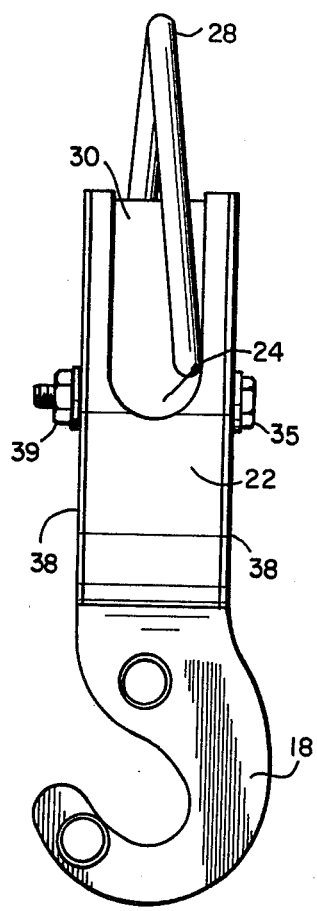
FIG. 3 is a side view of the load limiter shown in FIG. 2.
Figure 4:
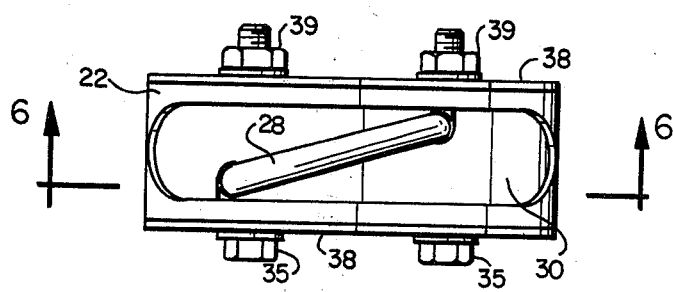
FIG. 4 is a top view of the load limiter shown in FIG. 2.

Referring now to FIG. 1 we see a typical load restraint system 10 for a helicopter or a cargo carrying aircraft. The load 12, typically a missile or other large item of cargo, is held in place by a multiplicity of low stretch restrainers 14, each of which is associated with an energy or load limiter absorber 16 and attachment means 18, by which the assembly is held in place on the floor of an aircraft.

Referring now to FIGS. 2, 3, 4, 5, 6, and 7 we see the structure and component parts of the preferred embodiment of an improved load limiting device 20, which is the subject of this invention. The basic structure is a hollow cylindrical housing 22. As shown, this housing is open ended and has an elongated slot 24 in its side and attachment means 18, usually in the form of a hook, located diametrically opposite the slot. Fitted into housing 22 is bifurcated double coil energy absorber 26. The absorber 26 is constructed of a single length of wire and includes two coils or reels 36a and 36b. Located within the central portion of coil 26 is a set of three connected loops 28, and 32a and 32b. The middle loop 28 is elongated and fits up through slot 24 so that at its outer extremity, it extends some distance beyond the periphery of the housing.

As shown, the diameter of the coils 36 are slightly smaller than the inner diameter of housing 22. This difference is required to allow enough room for loop 28 to rotate under the side of housing 22 and into slot 24 as the coil is put in place. This difference should be kept as small as possible to prevent the coil from flopping in use. To keep the coil in position a liner 30 is inserted between the inside wall of housing 22 and the outer periphery of coil 26. Liner 30 also serves to help keep the interior space of housing 22 clean by closing off slot 24.

Figure 6:
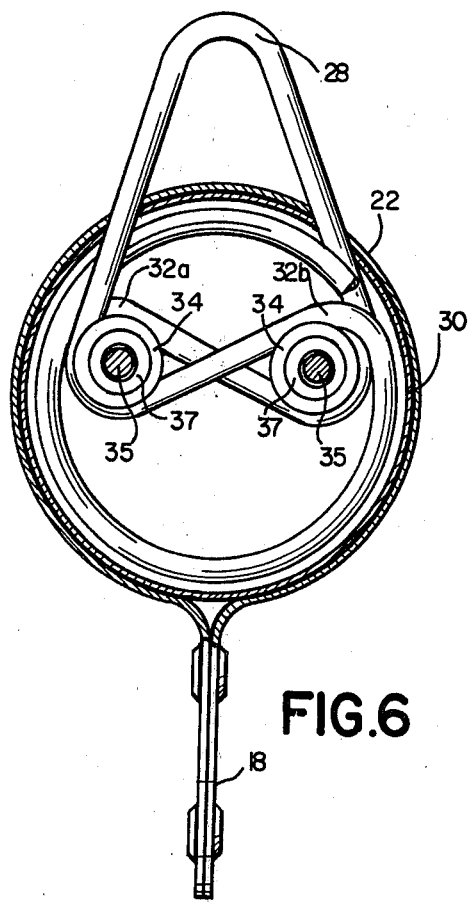
FIG. 6 is a front section view taken along line 6—6 of FIG. 4 showing the wire guides intertwined with the wire energy attenuator.
Figure 7:
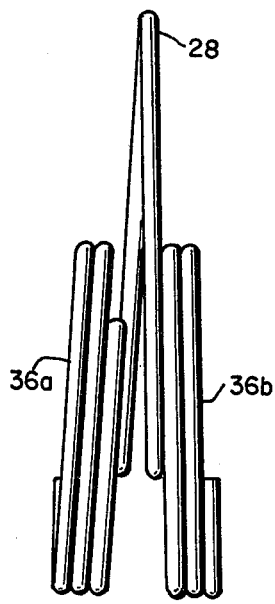
FIG. 7 is a side view of the energy attenuator shown in FIG. 6.
Figure 5:
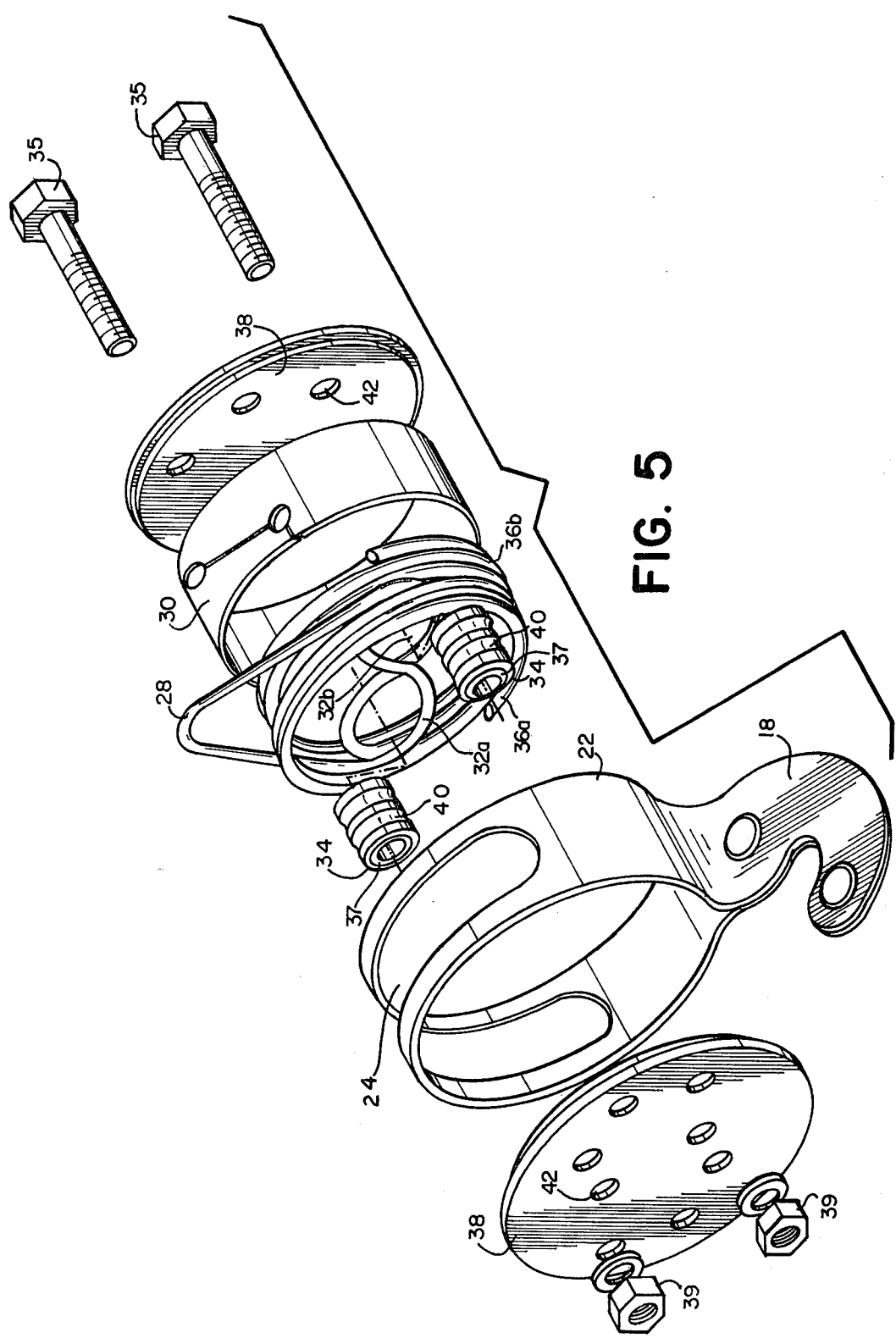
FIG. 5 is an exploded side view of the load limiter shown in FIG. 2.

Loops 32a and 32b in the set follow different paths. As shown in FIG. 6, loops 32a and 32b are intertwined and disposed around a pair of rotatable wire guides 34. The wire forming loops 32a and 32b, respectively, continue to integrally form reels or coils 36a and 36b. Wire guides 34 are supported by a pair of bolts or pins 35, which extend fore and aft through face plates 38. The guides 34 are the members over which wire bending occurrs, in the event attentuation is required. Guides 34 are in the form of a pair of rollers which, in turn, are closely fitted onto a pair of spacers 37. The inner diameter of spacers 37 is larger than the outer diameter of bolt 35 so that they tend to float on the bolts. This capability has a significant effect on the operation of the unit as will be explained hereinbelow. However, it should be noted that all references to guides 34 include spacer 37 as well. Plates 38 fit over the open ends of housing 22 and close it.

The absorber 26 is loosely positioned in place when it is inserted in the liner 30 and housing 22 and secured by guides 34, face plates 38 and nuts and bolts 39 and 35.

In use, strap restrainer 14 is connected to loop 28 and provides the means by which shock acceleration is transmitted into load limiter 20. The combined assembly of strap 14 and limiter 20 is attached to the support for load 12 by attachment means 18.

The wire guides 34 have a pair of smooth circumferential channels or grooves 40 cut into them. These channels are located so that when the guides 34 are properly positioned on bolts 35 they may engage loops 32a and 32b when the unit is assembled. However, the diameters of the channels are smaller than the loop openings so that the guides can move about within the circumference of the two loops. This provides a means by which the reaction load can be adjusted. Such adjustment is necessary because current production methods for cold drawn wire of the types preferred for the subject invention have an innate strength variability of five to ten percent from one roll to another. Thus, if the unit is to perform reliably, an adjustment for such variability must be included in the basic design.

Figure 8:
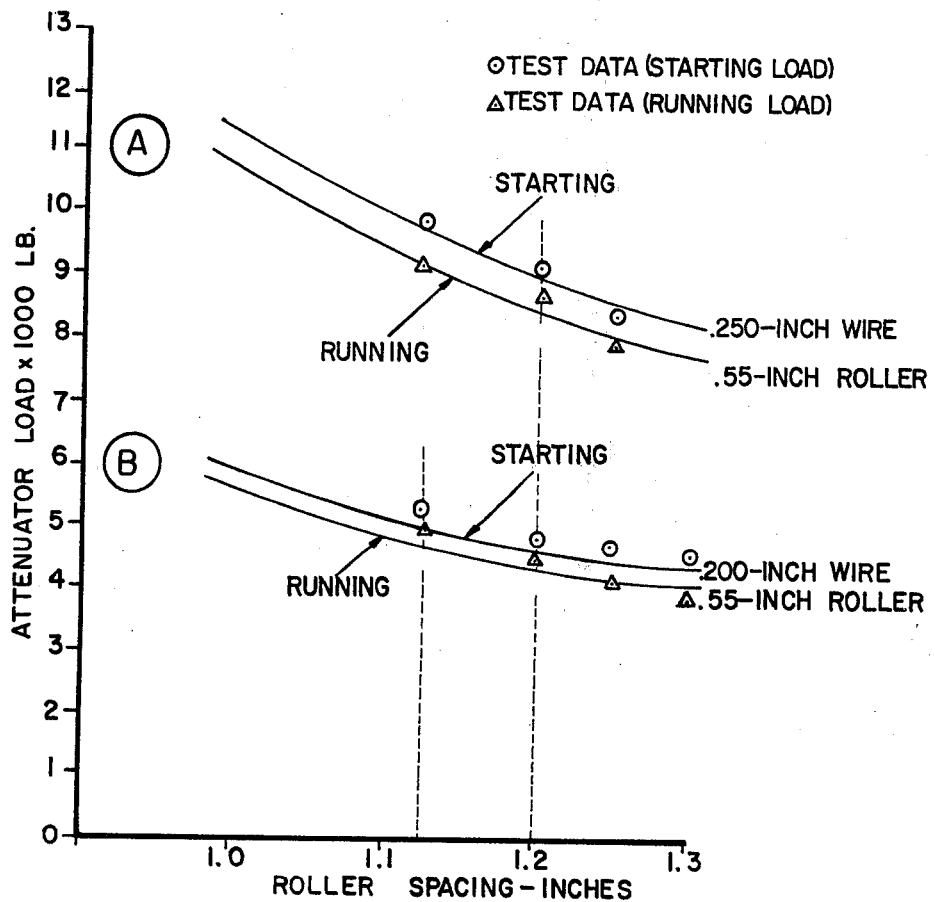
FIG. 8 is a graph showing the effects of wire diameter and guide spacing adjustment on the overal maximum load level achievable.

An adjustment of this type is achieved by varying the distance between guides 34 which varies the degree of wire bending. This is done in cooperation with circular face plate 38. As shown, each plate has a corresponding set of eight holes 42, two of which, located diametrically opposite each other, contain the ends of bolts 35. These are, in turn, restrained by nuts 39 which lock the whole assembly in place. The eight holes are in the form of four pairs, each pair being centered with the center of face plate 38. The distance between the holes of each pair is a different length. These lengths range from 1 inch to 1.3 inches in the preferred embodiment of the invention and provide the ability to vary the wire guide spacing within the region definded by loops 32a and 32b by the same amount, thus, allowing the load limiter to be fine tuned to the design load being restrained. In practice, this is merely done by detaching face plates 38 and rotating them about their center points until the desired spacing of holes 42 for bolts 35 is reached. At that point, the rollers are reinstalled, the face plates tightened and the unit is ready to be put back in service. The effect of this adjustment is shown in FIG. 8 which shows the adjustability of the unit's load attenuation both in terms of starting and running loads. This shows that, all other things being equal, the design response load can be fine tuned in almost linear fashion across the spacing range. Exactly how this works is explained hereinbelow.

FIG. 8 shows another factor of importance. The actual load for response is a function, among other things, of the tensile properties of the wire. For wire of given tensile properties, the greater the diameter the greater the load carrying capabilities it will exhibit. This is shown in FIG. 8 where curves A and B are for wire of nominally identical chemistry and physical properties and differing only in diameter.

In designing a specific unit, the choices of a particular size and composition wire is a function of the load restraint design problem being solved. Depending on the grade and diameter of wire used the gross load capability can range from 50 to 5,000 pounds. Given this, there are certain properties which the material proposed for a particular solution must meet. First, the wire must be "strong" enough to withstand the basic design load stresses imposed upon the restraint system. In addition, it must be stiff to perform effectively the work function forming the basis of this invention, yet ductile enough to be formed into coil 26. The interrelation of these and other factors are best illustrated by consideration of the manner in which the subject invention performs its intended function.

The basic principle of any load limiter is the conversion of accelerative crash kinetic energy to work or the application of force (F) over a distance (D). As noted, the major factor in establishing the reaction load limit is the basic strength of the wire which must be adequate to endure all normal operating, handling and environmental forces. The larger this is, the greater the stress bearing capabilities of coil 26, and consideration of these is the first step in establishing the parameters of a particular unit design. When a high 'G' shock load is received, it is first taken up by low elastic straps 14, which start pulling out on loop 28. While this can stretch a bit elastically, the major effect is for it to pull loops 32a and 32b up into wire guide 34. This establishes the gross load capability of the restraint system. Fine tuning is a function of the spacing of the guides. This affects first the amount of vertical static bending and then the amount of dynamic bending these loops must do after they make contact with grooves 40 in guides 34. The fine tuning effect of guide spacing is also shown in FIG. 8 which illustrates the variation of the reaction load for two different diameters of cold drawn wire over a range of guide spacings. These show that both in terms of starting and running loads, the reaction load limit can be adjusted over a range of 15 to 20 percent with a single given coil. This ability to adjust and fine tune the unit to meet a very wide variety of restraint situations is a major factor in the utility of this device.

Once the loops make contact with the guides, they cannot vertically bend further, so the outward accelerative force on loop 28 is transmitted down into loops 32 causing them to move outward in an effect to follow it. In so doing the wire in the outer loops must move through guides 34 alternately bending and straightening twice as it passes first over and under the two guide rollers. The ability to do this cleanly is affected by the design of spacer 37. The inner diameter is notably larger than that of bolt 35 so that while the basic bending angle is established by the particular set of holes 43 chosen the spacer/guide combination will float within the area defined by loops 32a and 32b. Thus, when the loops are pulled up snug within channels 40 the guide itself is not locked in place but is free to rotate around bolt 35 as the loops start to pull out and travel through them. This has the effect of essentially eliminating any friction between the wire and the channel surface. While the presence of friction might add to the ability of the unit to absorb shock energy it also creates considerable problems in the free travel of the wire and contributes to the rapid wear of the machined guide surface. Since the unit is designed to be refurbished for further use such uncontrolled wear would seriously compromise the fine tuning capability of the unit. Where the friction reaches an excessive value the total wire load might well exceed the yield point and cause such severe necking down at the bending point that the wire will fail in tension, causing the load to break free. The energy absorbed by this dual bending and straightening is sufficient to attenuate the shock load to the point where the load motion is well within the total restraint expansion limit.

Once the loops start to move they start to pull out on the ends of the wire in reels 36a and 36b. As established, the end of each reel bends into the particular guide channel 40 adjacent to it. As it starts to move the wire element adjacent to the end also moves to follow it. In so doing the reel itself starts to rotate within housing 22. Since the direction of the wire entering the guide is essentially tangential to the circumference of the reel at the point of entry into the guide, relatively little energy is absorbed at this point. This is reduced even further by liner 30 which reduces wall friction of the wire as it rotates within housing 22. The whole intention is for the shock energy to be absorbed by wire bending. The reels do serve a second important function. The amount of pull out or stroke is a function of how much travel length the load will have before it breaks free. This can be easily adjusted by adding or subtracting turns to the reels forming the coil.

While almost any wire can be adapted to use in the subject invention, depending on the service conditions encountered, only a relatively few exhibit the qualities of strength, stiffness and ductility in proportions needed for an efficient unit. One which has been found to be especially useful in these respects is cold drawn 302 stainless steel. This has the further advantage of being corrosion resistant and is relatively low in cost as well. It is also available in a wide range of diameters and mechanical properties so that exact matching of particular design requirements is a relatively straightforward operation.

Figure 10:
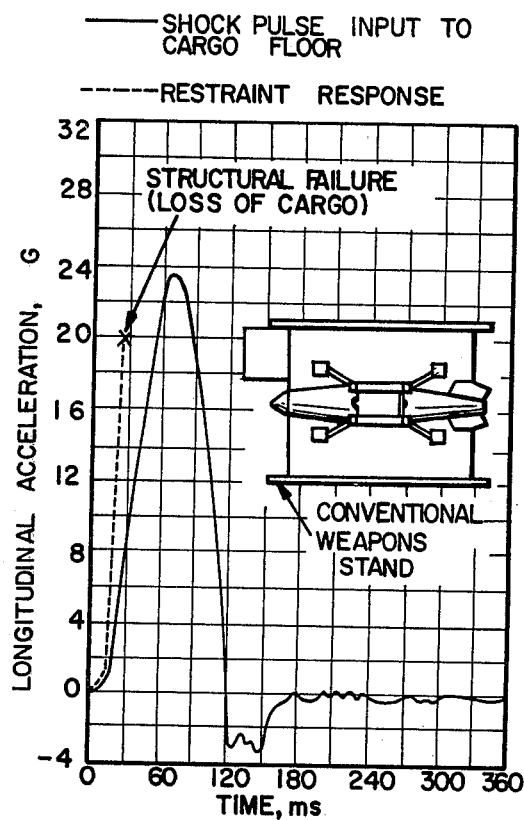
FIG. 10 is a graph showing the response of a system incorporating excessive elongation straps in a crash environment.
Figure 9:
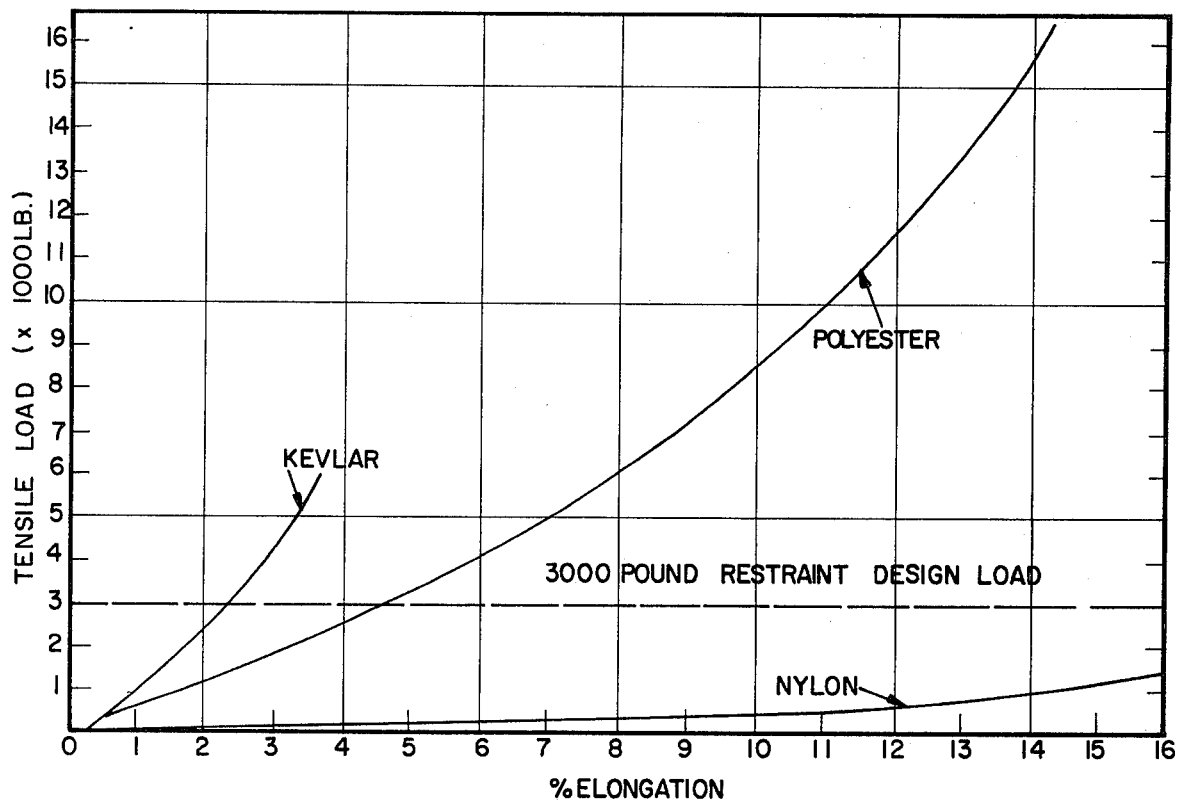
FIG. 9 is a graph showing the elongation of different strap materials as a function of tensile loading.

While not a part of the basic load limiter structure, strap restraint 14 is also an important element in the overall design of a strap/limiter system. For this purpose it is found that under the proper conditions, chain, wire cable, rope, and various woven fabric webs can all be used. The important point is that the restraint material not be too elastic for the design conditions of interest. As a practical matter, an elongation limit of about 5 percent at the design load is considered the maximum which can be safely accomodated. This provides a safe limit to the amount of load motion which must be accomodated before the load limiter comes into use. What happens if this is exceeded is shown in FIG. 9 which is the elongation exhibited by three common web materials in limiting a 900 pound load to a 3,000 pound restraint design load (military C-2A requirement). It shows both Kevlar and polyester to be within this criterion with Kevlar being preferred. Nylon, on the other hand, stretches excessively so that in use the load limiter would be unable to respond within the approximate 100 microsecond period of a typical 25G shock pulse. As a result, the entire load will be restrained by the web resulting in rupture as shown in FIG. 10.

Figure 11:
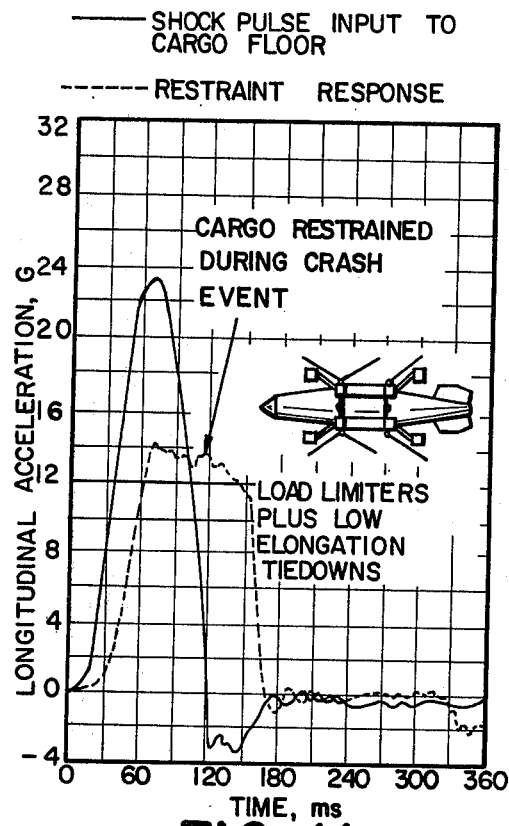
FIG. 11 is a graph showing the response of a system with low stretch straps and load limiters of the preferred embodiment.
Figure 12:
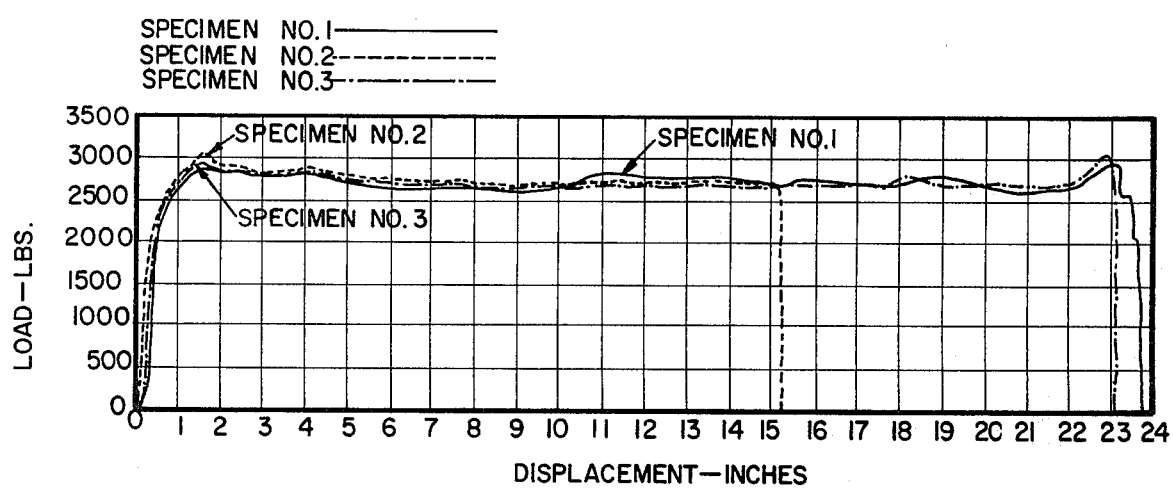
FIG. 12 is a graph showing the static repeatability of three tests made with load limiters according to the subject invention.
Figure 13:
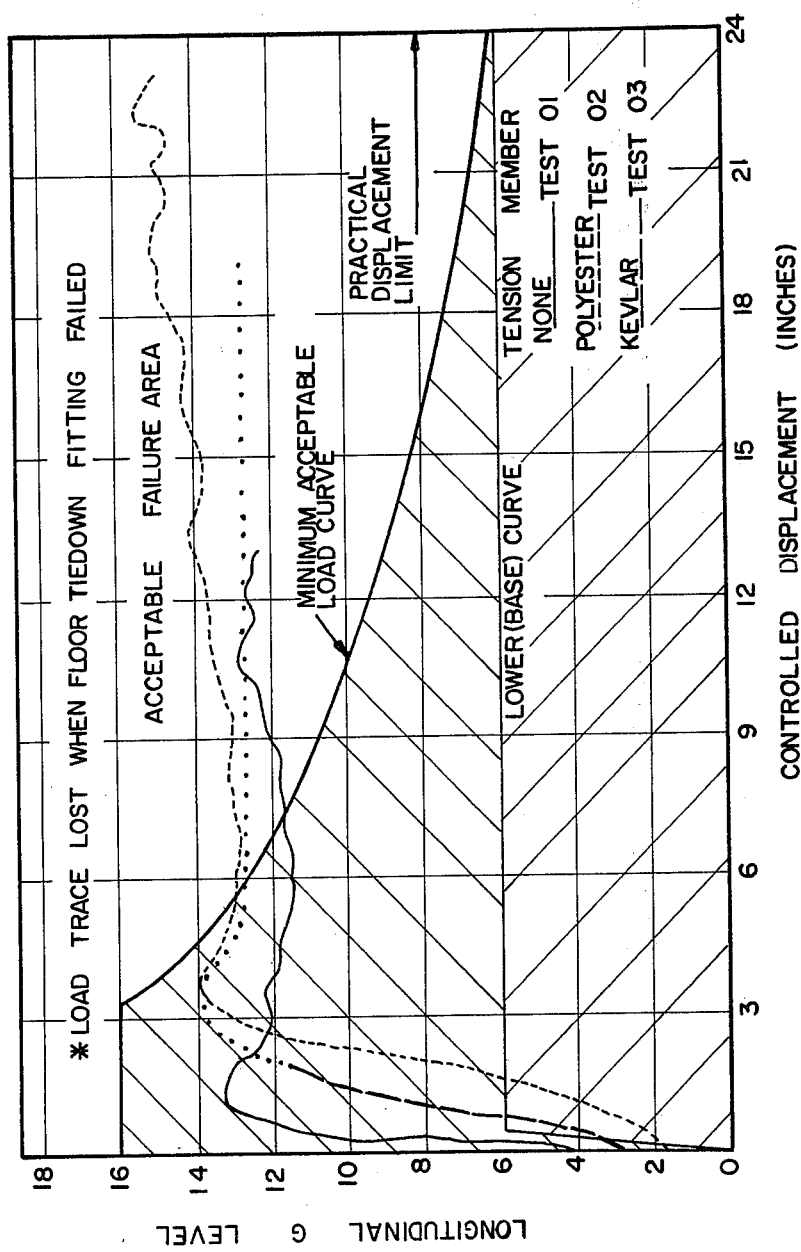
FIG. 13 is a graph showing the dynamic response of a load limiter in restraining a simulated crash pulse.

The utility of adding a load limiter is shown in FIG. 11. This shows the effect of including a load limiter of preferred design into a strap restrainer system of the basic type used in FIG. 10. This shows both a delay and significant attenuation of the shock pulse energy which is the area under the pulse curve. That this effect is reliably repeatable is shown in FIG. 12 which is a static test of three separate units as described herein, which had been set to react at a load of 3,000 pounds. This shows the unit to stretch eleastically as loops 36a and 36b pull up into wire guides. Once, however, the load reaches 3,000 pounds displacement increases rapidly as the wire starts to pull through the guides. In this curve tests 1 and 3 are for a 23 inch stroke while test 2 was for an 18 inch stroke. The response in a dynamic situation is given in FIG. 13 which shows the displacement achieved in a simulated crashes with no straps, and Kevlar and polyester straps. (The Kevlar curve is extrapolated since the floor tiedown failed before the load limiter came into use.) Note that with no strap response is almost instantaneous, load displacement being less than an inch before the limitation reaction starts. On the other hand, with polyester the load will move over three inches befoe reaction starts. While the load is safely restrained in both tests, note that the total displacement is closer to the maximum limit with polyester. This indicates that with suitable restraint designs straps may be displaced altogether. In any event, the use of the limiter greatly reduces the harness complexity needed to restrain a load under crash conditions. These data are presented by way of example to illustrate the significant improvement afforded by this new and novel attenuator disclosed herein.

The present invention may be embodied in other specific forms without departing from the spirit or essential attributes thereof and accordingly reference should be made to the appended claims rather than to the foregoing specification as indicating the scope of the invention.

What is claimed is:

1. An energy absorption apparatus which comprises:
   a housing;
   an energy absorption means which includes a single length of wire forming a first loop, a second loop, and a third loop, said third loop being interposed between said first and second loops, said wire continuing to form a first coil from said first loop and a second coil from said second loop, said first and second loops being positioned within the circumference of said first and second coils, and said third loop being positioned outside the circumference of said third loop; and
   a pair of spaced guide means projecting through said first and second loops and connected to said housing whereby energy is absorbed by bending said wire about said guide means in the event a predetermined force is exerted between said third loop and said housing.

2. The apparatus of claim 1 wherein said guide means are rotatably connected to said housing.

3. The apparatus of claim 2 wherein said guide means have grooves therein to engage said wire of said first and second loops.

4. The apparatus of claim 3 wherein a line between said pair of guides is perpendicular to the force exerted between said third loop and said housing.

5. The apparatus of claim 4 wherein the distance between said pair of guides may be varied so as to vary the magnitude of the predetermined force.

6. The apparatus of claim 5 wherein said housing is cylindrical, encompasses said first and second coils, has a slot therein, and said third loop projects through said slot.

7. The apparatus of claim 6 which includes a pair of circular plates adapted to be secured to the opposite ends of said cylinder of said housing.

8. The apparatus of claim 7 wherein said guide means are connected to said plates.

9. The apparatus of claim 8 wherein each of said plates have at least two pair of holes therein, each pair of holes having a different distance therebetween and being centered with respect to said plate; said pair of guides being connected to said plates by passing through a pair of said holes, the space between said pair of guides being determined by the pair of holes selected.

10. The apparatus of claim 9 which includes a cylindrical liner interposed between said coils and said housing.

* * * * *